March 20, 1928.

E. CHESHIRE 1,663,241

SAW BLADE

Filed Dec. 9, 1926

Witness:
A. Burkhardt

Inventor:
Edward Cheshire,
By Wilkinson, Huxley, Byron & Knight
attys.

Patented Mar. 20, 1928.

1,663,241

UNITED STATES PATENT OFFICE.

EDWARD CHESHIRE, OF ST. PETERSBURG, FLORIDA.

SAW BLADE.

Application filed December 9, 1926. Serial No. 153,483.

The present invention relates to saw blades.

The invention has been illustrated in connection with rotary saw blades, though as the description proceeds it will be clear that the invention is of broader application. As is well understood, all saws must have clearance at the teeth, which clearance may be provided by spreading the teeth at the cutting edge or upsetting said teeth. By reason of this clearance the chips cut by said teeth have a passageway for escape from the cutting edge. As heretofore provided, however, saws have been limited in their usefulness to the cutting of either relatively hard material or relatively soft material, depending upon their design. Up to the time of the present invention no saw, in so far as applicant is informed, had the advantage that uniform and continuous clearance had been provided for cutting metal such as copper, brass, and the alloys used in the printing trade, which saw was also useful in cutting wood.

In the cutting of relatively soft material such as wood, it has been common practice to use what are known in the art as soft saws. These saws are tempered so that they can be set or swedged and afterward filed to bring them to a keen edge, being too soft to cut metal such as copper and zinc and the various alloys such as are used in the printing art, except with many repeated sharpenings. Due to the fact that sharpening is often done in a manner lacking precision, it frequently happens that soft saws have only one or two saw teeth which are effective in the cutting operation. In the printing trade hollow ground saws have been used for cutting "brass rule". Such saws have left much to be desired, however, when used for sawing the softer metals, for the reason that the hollow grinding distributes the clearance over a considerable diameter of the saw instead of utilizing the possible side clearance to a maximum.

An object of the present invention is to provide a saw blade that is universally effective for sawing materials of widely varying degrees of hardness.

A further object is to provide a saw blade of universal application which is more effective than prior saws in allowing the chips to get away from the cutting edge.

A further object is to provide a saw blade for cutting both soft and hard material, which saw blade may be tempered to the degree necessary for cutting relatively hard material, whereby the necessity for resharpening is minimized.

With these and various other objects in view, the invention consists of certain novel features of construction and operation as will be more fully described and particularly pointed out in the specification, drawings and claims appended hereto.

In the drawings, wherein like reference characters are used to designate like parts—

Figure 1:
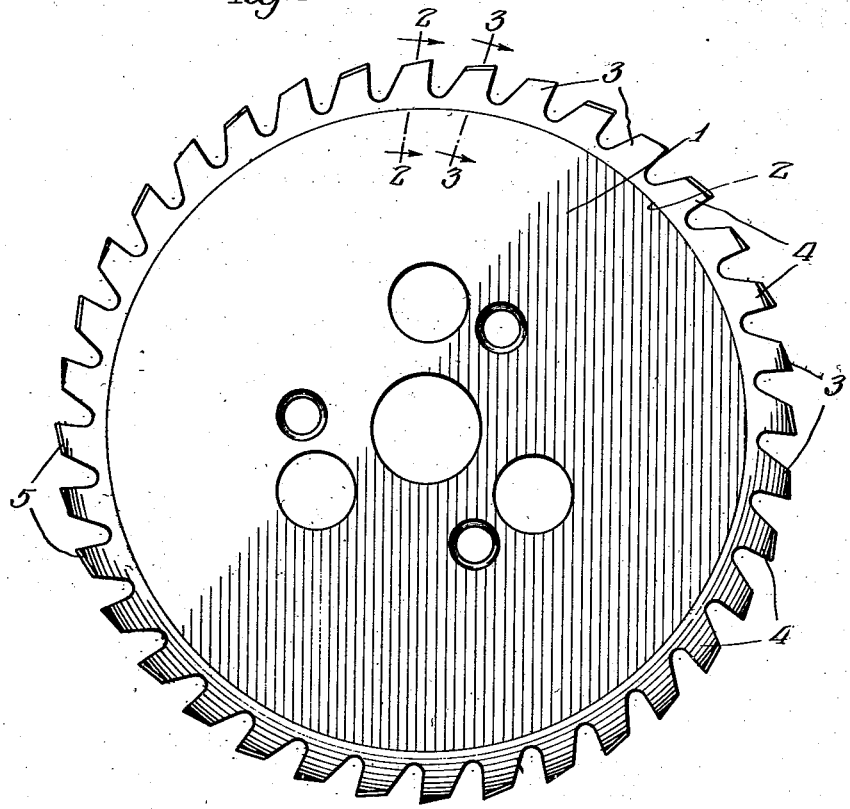
Figure 1 is a side view of a saw embodying the principles of the present invention.

The present invention has been illustrated in connection with a circular saw. Said circular saw comprises the disk portion 1, which disk portion has a substantially uniform thickness out to the circle indicated by the numeral 2, which circle is disposed only a short distance within the root of the saw teeth. The disk portion 1 may be provided with the usual apertures, whereby the saw blade may be mounted upon its support. The saw teeth, as will be noted from an inspection of the drawing, are of two shapes, alternate teeth being identical with one another and the intermediate teeth being identical with one another. The numerals 3—3 indicate teeth of one design, and the alternate teeth, indicated by the numerals 4—4, are of a different design.

Figure 2:
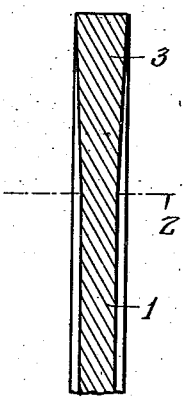
Figure 2 is a sectional view on an enlarged scale of one of the teeth of the saw blade illustrated in Figure 1, said sectional view being taken along the plane indicated by the arrows 2—2 of Figure 1.
Figure 3:
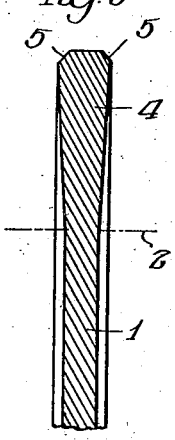
Figure 3 is a sectional view of another tooth of the saw blade illustrated in Figure 1, Figure 3 being taken along the plane indicated by the arrows 3—3 of Figure 1.

It will be noted from an inspection of Figures 1 and 2 that the saw teeth 3—3 are upset to have a gradually flaring cross sectional outline from the circle 2 to the outer extremity of said teeth. The intermediate teeth 4—4, as will be noted from an inspection of Figure 3, are provided with clearance at their outer cutting edges, which clearance is due to the fact that the peripheral surface of each of said teeth 4—4 is beveled off, as indicated by the numeral 5.

The saw blade according to the present invention is tempered to suit the hardest material which is to be cut, and must, accordingly, be ground to bring the cutting edges of the teeth to the necessary keenness.

By reason of the fact that a maximum of clearance is provided within the circle 2, and by reason of the clearance provided by the beveled off edge portions of the intermediate teeth 4—4, the saw is efficient not only in the cutting of relatively hard material, for which it has been tempered, but is also decidedly effective in the cutting of relatively soft material, which in the absence of the effective clearance space provided would quickly foul the saw.

The present invention is intended primarily for use in the printing trade, as for example in connection with composing room saws. Inasmuch as such saws are called upon frequently to saw wood, brass, copper and alloys of varying degrees of hardness, together with other materials differing widely in hardness, and inasmuch as frequently materials of different hardness are to be cut in a single cutting operation, the universal features of the saw are particularly advantageous in that art.

What is claimed is—

1. A saw blade for cutting both hard and soft materials comprising a supporting portion and teeth projecting therefrom, said supporting portion having a substantially uniform thickness, said teeth being flared continuously from said supporting portion outwardly, intermediate teeth being beveled at their outer edges to provide clearance.

2. A saw blade for cutting both hard and soft materials comprising a supporting portion and teeth projecting therefrom, said supporting portion having a substantially uniform thickness, said teeth being flared continuously from said supporting portion outwardly, intermediate teeth being beveled at their outer edges to provide clearance, said saw blade being tempered to suit the hardest material which it is intended to cut.

3. A circular saw blade having a flat supporting portion of substantially uniform thickness and a toothed edge portion which edge portion flares outwardly from said supporting portion symmetrically with respect to said supporting portion, intermediate teeth of said edge portion being beveled at their outer edges to provide clearance.

4. A circular saw blade having a flat supporting portion of substantially uniform thickness and a toothed edge portion which edge portion flares outwardly from said supporting portion symmetrically with respect to said supporting portion, intermediate teeth of said edge portion being beveled at their outer edges to provide clearance, said saw blade being tempered to suit the hardest material which it is intended to cut.

5. In a device of the character described, the combination of a supporting portion having teeth projecting therefrom, said teeth flaring outwardly, intermediate teeth being beveled, said teeth being of the same effective height.

6. In a device of the character described, the combination of a supporting portion having teeth projecting therefrom, said teeth flaring outwardly from a knuckle defining teeth portions, intermediate teeth of said device being beveled.

7. In a device of the character described, the combination of a supporting portion having teeth projecting therefrom, said teeth flaring outwardly from a knuckle defining teeth portions, intermediate teeth of said device being beveled and having the same effective height.

8. A saw for sawing wood or metal or successions of wood and metal comprising a disc having a gradually outwardly thickening peripheral toothed annulus to provide lateral clearance back from the ends of the teeth, the depth and cutting circle of all of the teeth being substantially the same but alternate teeth having respectively straight outer peripheral edges and the intermediate teeth being beveled off at the side corners.

9. A circular saw blade including a supporting portion having teeth projecting therefrom, said teeth flaring outwardly from a defining knuckle, intermediate teeth of said saw being beveled, the depth of said teeth from said knuckle being equal.

10. A circular saw blade including a supporting portion having teeth projecting therefrom, said teeth flaring outwardly from a defining knuckle, intermediate teeth of said saw being beveled, the depth of said teeth from said knuckle being equal, said saw blade being tempered to suit the hardest material which it is intended to cut.

Signed at Cleveland, Ohio, this 6th day of December, 1926.

EDWARD CHESHIRE.